(12) United States Patent
Dagley et al.

(10) Patent No.: US 9,169,336 B2
(45) Date of Patent: Oct. 27, 2015

(54) MODIFICATION OF PROPYLENE POLYMERS

(75) Inventors: Ian John Dagley, Victoria (AU); Graeme Moad, Victoria (AU); Lance Victor Nichols, Victoria (AU)

(73) Assignee: POLYMERS CRC LTD, Victoria (AU)

( * ) Notice: Subject to any disclaimer, the term of this patent is extended or adjusted under 35 U.S.C. 154(b) by 209 days.

(21) Appl. No.: 13/807,099

(22) PCT Filed: Jun. 28, 2011

(86) PCT No.: PCT/AU2011/000789
§ 371 (c)(1),
(2), (4) Date: Dec. 27, 2012

(87) PCT Pub. No.: WO2012/000022
PCT Pub. Date: Jan. 5, 2012

(65) Prior Publication Data
US 2013/0137834 A1     May 30, 2013

(30) Foreign Application Priority Data

Jun. 28, 2010  (AU) .............................. 2010902848

(51) Int. Cl.
| | | |
|---|---|---|
| *C08F 8/06* | (2006.01) | |
| *C08F 8/50* | (2006.01) | |
| *C08F 10/06* | (2006.01) | |
| *C08J 5/18* | (2006.01) | |
| *C08L 23/10* | (2006.01) | |
| *D01F 6/06* | (2006.01) | |
| *C08K 5/09* | (2006.01) | |

(52) U.S. Cl.
CPC ... *C08F 8/50* (2013.01); *C08F 8/06* (2013.01); *C08F 10/06* (2013.01); *C08J 5/18* (2013.01); *C08K 5/09* (2013.01); *C08L 23/10* (2013.01); *D01F 6/06* (2013.01); *C08F 2810/10* (2013.01); *C08J 2323/10* (2013.01); *C08L 2205/02* (2013.01)

(58) Field of Classification Search
None
See application file for complete search history.

(56) References Cited

U.S. PATENT DOCUMENTS

| | | |
|---|---|---|
| 3,826,780 A | 7/1974 | Kiss et al. |
| 3,898,209 A | 8/1975 | Watson et al. |
| 3,940,379 A * | 2/1976 | Castagna et al. .............. 525/387 |
| 5,041,491 A | 8/1991 | Turke et al. |
| 5,066,686 A | 11/1991 | Fodor et al. |
| 5,096,638 A | 3/1992 | Meyke |
| 6,077,914 A * | 6/2000 | Arabinick et al. ............ 525/344 |
| 6,599,985 B2 | 7/2003 | Fujii et al. |
| 6,620,892 B1 | 9/2003 | Bertin et al. |
| 6,951,904 B1 | 10/2005 | Peeters et al. |
| 2002/0065371 A1 | 5/2002 | Fujii et al. |
| 2007/0200272 A1* | 8/2007 | Horst et al. ............. 264/211.24 |
| 2009/0160073 A1 | 6/2009 | Tollefson |

FOREIGN PATENT DOCUMENTS

| | | |
|---|---|---|
| CN | 1357011 A | 7/2002 |
| WO | WO 98/37107 | 8/1998 |
| WO | WO 2007/096276 | 8/2007 |
| WO | WO 2008/037398 | 4/2008 |
| WO | WO 2009/012523 | 1/2009 |

OTHER PUBLICATIONS

Occupational Health Guideline for Hydrogen Peroxide, 1978.*
NJ Health Hazardous Substance Fact Sheet, 2008.*
International Search Report and Written Opinion for International Application No. PCT/AU2011/000789, mailed Sep. 14, 2011, 12 pages.
Extended European Search Report dated Feb. 10, 2014 in cooresponding EU Application No. EP2585500.

* cited by examiner

*Primary Examiner* — Robert C Boyle
(74) *Attorney, Agent, or Firm* — Cooley LLP

(57) ABSTRACT

The invention relates to a process for increasing the melt flow index of a propylene polymer, the process comprising melt mixing the propylene polymer in the presence of aqueous hydrogen peroxide.

10 Claims, 1 Drawing Sheet

MODIFICATION OF PROPYLENE POLYMERS

CROSS-REFERENCE TO RELATED APPLICATIONS

This application is a national stage application of International Application No. PCT/AU2011/000789, filed Jun. 28, 2011, which claims priority to Australian Application Serial No. 2010902848, filed Jun. 28, 2010, all of which are hereby incorporated by reference in their entireties.

FIELD OF THE INVENTION

The present invention in general relates to a process of modifying propylene polymers. In particular, the invention relates to a process of increasing the melt flow index (MFI) of propylene polymers.

BACKGROUND OF THE INVENTION

Propylene polymers are used widely throughout the world in a diverse range of applications such as agriculture, construction, fibre technology, health and hygiene, and packaging. Common propylene polymers include polypropylene and random and heterophasic polypropylene copolymer which can incorporate ethylene and possibly other comonomers.

Propylene polymers such as polypropylene are generally manufactured in large scale reactors. Depending upon their intended application, a given propylene polymer may be manufactured in different grades such that it exhibits a variety of processing properties. For example, polypropylene may be manufactured with a relatively low MFI (typically characterised by a high average molecular weight and a broad molecular weight distribution) for use in blow-moulding applications, or with a relatively high MFI (typically characterised by a lower average molecular weight and a narrower molecular weight distribution) for use in injection moulding applications.

However, there is generally insufficient flexibility in large scale manufacturing operations to prepare the numerous grades of propylene polymers required by downstream converters. Some grades of propylene polymers are therefore produced by tailored post-reactor modification processes using a base resin that is produced on mass. For example, propylene polymers such as polypropylene may be reacted with organic peroxides in a post-reactor modification melt mixing process to prepare grades of polypropylene having a higher MFI and lower polydispersity than the base resin.

The use of organic peroxides is invariably complicated by the formation of peroxide-derived by-products which can present problems due odour or toxicity and can limit the use of the product particularly in food contact applications.

While other processes have been developed for producing post-reactor modified propylene polymers, an opportunity remains to address or ameliorate one or more disadvantages or shortcomings associated with existing processes, or to at least provide a useful alternative process.

SUMMARY OF THE INVENTION

The present invention provides a process for increasing the melt flow index of a propylene polymer, the process comprising melt mixing the propylene polymer in the presence of aqueous hydrogen peroxide.

Those skilled in the art will appreciate that propylene polymers are typically very hydrophobic in character and as such it would be counterintuitive to combine the polymer in a molten sate with aqueous hydrogen peroxide in order to promote some form of chain scission reaction.

It has now been found that aqueous hydrogen peroxide can be used to promote an effective and efficient increase in the MFI of propylene polymers. Despite the inherent incompatibility between the aqueous hydrogen peroxide and the molten propylene polymer, the aqueous hydrogen peroxide surprisingly has sufficient activity to promote chain scission of the propylene polymer and thereby increase its MFI.

The aqueous hydrogen peroxide not only promotes an effective and efficient increase in the MFI of propylene polymers, it is also believed the main by-product of the resulting chain scission reaction is simply water. Accordingly, unlike conventional organic peroxide based melt mixing processes, the process according to the invention can increase the MFI of propylene polymers with little or no production of odoriferous or toxic peroxide-derived by-products. Modified propylene polymers produced in accordance with the invention therefore present improved utility.

In one embodiment, the melt mixing is performed with venting to remove water from the melt.

The present invention also provides the use of aqueous hydrogen peroxide to increase the melt flow index of a propylene polymer.

The present invention further provides a propylene polymer produced in accordance with the process of the invention.

The present invention also provides a moulded article obtained by injection moulding a propylene polymer produced in accordance with the process of the invention.

The present invention still further provides propylene polymer fibre obtained by melt spinning a propylene polymer produced in accordance with the process of the invention.

The present invention also provides an article comprising propylene polymer fibre obtained by melt spinning a propylene polymer produced in accordance with the process of the invention.

The present invention yet further provides propylene polymer film formed using a propylene polymer produced in accordance with the process of the invention.

The present invention yet further provides an article comprising propylene polymer film formed using a propylene polymer produced in accordance with the process of the invention.

Further aspects of the invention are described in more detail below.

BRIEF DESCRIPTION OF THE DRAWINGS

Certain embodiments of the invention will now be illustrated by way of example only with reference to the accompanying drawings in which.

DETAILED DESCRIPTION OF THE INVENTION

Figure 1:
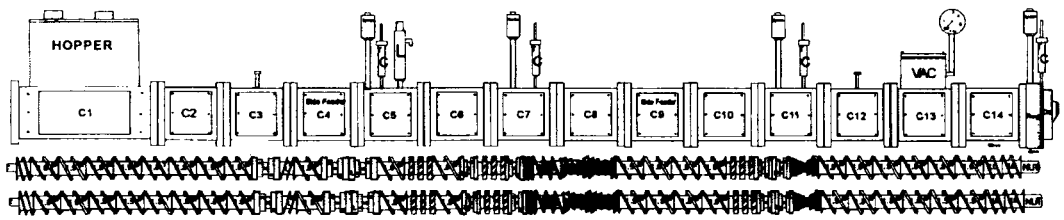
FIG. 1 illustrates the configuration of a standard screw profile of a JSW TEX 30a 30 mm Twin Screw Extruder used to conduct the process in accordance with the present invention. The screw configuration provides for a more aggressive (high shear) screw with liquid injection at C5, vacuum venting at C13 and temperature and pressure sensors at C5, C7, C11 and the die.

Melt flow index (MFI) referred to herein is a measure of the ease of flow of the melt of a thermoplastic polymer. It is defined by reference to the mass of polymer, in grams, flowing in ten minutes though a capillary of a specific diameter and length by a pressure applied via prescribed alternative gravimetric weights for alternative prescribed temperatures. MFI values referred to herein are those determined according to ASTM D1238 at a temperature of 230° C. with a ram weight of 2.16 kg. MFI measurements reported herein were conducted using an Extrusion Plastometer (Melt Indexer).

The process of the invention is used to at least increase the MFI of a propylene polymer, and may also be used to narrow the polydispersity of a propylene polymer. The propylene polymer will typically be modified to afford a grade of polymer that exhibits appropriate processing and other relevant properties for the intended application.

As used herein, the term "propylene polymer" is intended to include homopolymeric polypropylene and copolymers of propylene with other copolymerisable monomers wherein the major portion (i.e. greater than about 50 mol %) of the copolymer is comprised of polymerised propylene moieties. Suitable copolymerisable monomers include one or more of ethylene, butylenes and other unsaturated aliphatic hydrocarbons, vinyl esters (e.g. vinyl acetate), and (meth) acrylics (e.g. butyl acrylate, acrylic acid).

In one embodiment, the copolymerisable monomers include one or more $C_4$-$C_{12}$ α-olefin aliphatic comonomers.

In a further embodiment, the propylene polymer is a copolymer wherein greater than about 50% wt/wt of the copolymer is comprised of polymerised propylene moieties.

The propylene polymer used will be chain scissionable. By being "chain scissionable" is meant that the propylene polymer can undergo polymer chain scission reactions that give rise to an increase in the polymers MFI. A propylene polymer with an increased MFI produced in accordance with the invention may be conveniently referred to herein as a "modified" propylene polymer.

The propylene polymer may be virgin polymer (i.e. post-reactor) or waste polymer (i.e. post-consumer).

In one embodiment, the propylene polymer used is reactor powder.

By the propylene polymer being "reactor powder" is meant polymer that has not been blended or melt mixed with one or more additives (such as stabilisers (e.g. antioxidants and UV stabilisers)) after being formed in the reactor. Such polymer is often referred to as "unstabilised reactor powder".

It has been found that performing the process of the invention using propylene polymer reactor powder can minimise discolouration (for example yellowing) and/or the presence of volatiles within the resulting polymer product. Without wishing to be limited by theory, it is believed that additives such as stabilisers within propylene polymer used in accordance with the invention can be oxidised to form coloured and/or volatile reaction products that can adversely impact on the quality of the resulting polymer.

Those skilled in the art will appreciate that propylene polymers processed with organic peroxides often contain volatile organic compounds (residues of the organic peroxides and/or reaction products derived therefrom). The presence of such volatile compounds can limit application of the resulting propylene polymer, for example in food contact applications. Propylene polymer produced in accordance with the present invention can advantageously comprise low if not undetectable levels (as measured by gas chromatography/mass spectrometry (GCMS)) of volatile organic compounds other than polyolefin oligomers from propylene polymer (e.g. propylene polymer oligomers such as C6-C15 propylene polymer oligomers). In other words, the profile (i.e. type) of volatile organic compounds of propylene polymer produced in accordance with the invention can advantageously be substantially the same as that of the starting propylene polymer. The propylene polymer produced in accordance with the invention can therefore be produced with low if not undetectable levels (as measured by gas chromatography/mass spectrometry (GCMS)) of volatile organic compounds such as acetone, tertiary butyl alcohol and aromatic compounds (that are commonly observed in propylene polymers that have been melt processed with organic peroxides).

In one embodiment, the resulting propylene polymer having an increased melt flow index does not comprise volatile organic compounds, as measured by gas chromatography/mass spectrometry (GCMS), other than those of a type present in the propylene polymer prior to it being melt mixed with the aqueous hydrogen peroxide.

In another embodiment, the type of volatile organic compounds present in the resulting propylene polymer having an increased melt flow index, as measured by gas chromatography/mass spectrometry (GCMS), are substantially the same as those present in the propylene polymer prior to it being melt mixed with the aqueous hydrogen peroxide.

In a further embodiment, the resulting propylene polymer having an increased melt flow index only comprises volatile organic compounds, as measured by gas chromatography/mass spectrometry (GCMS), selected from polyolefin oligomers. The polyolefin oligomers may be, for example, C6-C15 polyolefin oligomers, such as propylene oligomers (e.g. C6-C15 propylene oligomers).

The propylene polymer used in accordance with the invention may be a polypropylene homopolymer, polypropylene copolymer, or polymer blend containing a polypropylene homopolymer and/or polypropylene copolymer.

Suitable polypropylene homopolymers include isotactic polypropylene, atactic polypropylene and syndiotactic polypropylene.

Polypropylene copolymers include copolymers of propylene and other monomers in an amount that will generally be determined by the intended application of the modified polymer. In one embodiment, the polypropylene copolymers include copolymers of propylene and one or more other monomers in an amount up to about 0.1% wt/wt to about 10% wt/wt.

In one embodiment, the propylene polymer is a copolymer of propylene and ethylene.

Suitable polypropylene copolymers also include copolymers of propylene and one or more $C_4$-$C_{12}$ α-olefin aliphatic comonomers. The α-olefin content of the copolymer may range from about 0.1% wt/wt to about 10% wt/wt. Specific α-olefin aliphatic comonomers include, 1-butene, 1-pentene, and 1-hexene.

The propylene polymers used may comprise conventional additives such as processing aids, antioxidants, UV stabilisers, pigments, etc. Such additives may also be introduced during the melt mixing process according to the invention.

In one embodiment, the process of the invention further comprises melt mixing one or more additives with propylene polymer that has previously been melt mixed in the presence of the aqueous hydrogen peroxide.

In addition to promoting an increase in the MFI of the propylene polymers, the process in accordance with the invention may also promote a decrease in the polymers polydispersity (i.e. decrease the breadth of the polymers Molecular Weight Distribution (MWD)). All factors being equal, propylene polymers with a narrow molecular weight distribution will have a several advantages over propylene polymers of the same melt flow index with a broader molecular weight distribution. These include reduced warpage, more uniform shrinkage, more uniform drawdown and a substantially increased elongation at break.

In one embodiment, the process of the invention further promotes a decrease in the propylene polymer's polydispersity.

As used herein the term "polydispersity" is intended to mean the ratio of weight-average molecular weight ($M_w$) to number-average molecular weight ($M_n$). The polydispersity of a given propylene polymer can be readily determined by a person skilled in the art using gel permeation chromatograph (GPC).

Those skilled in the art will appreciate that the simple effects of shear and temperature can promote a limited degree of chain scission during melt mixing of propylene polymers that may give rise to a slight or limited increase in its MFI and/or even a slight or limited decrease in its polydispersity. By the process of the invention "increasing the melt flow index of a propylene polymer", or promoting "a decrease in the propylene polymer's polydispersity" is meant an increase/decrease above/below that which can be achieved (if any) simply by melt mixing the propylene polymer in the absence of the aqueous hydrogen peroxide. Accordingly, the increase in MFI is relative to the MFI of the propylene polymer per se, or if the melt mixing conditions per se (in the absence of the aqueous hydrogen peroxide) promote an increase in the polymers MFI, then relative to the MFI of that melt mixed propylene polymer. Similarly, the decrease in polydispersity is relative to the polydispersity of the propylene polymer per se, or if the melt mixing conditions per se (in the absence of the aqueous hydrogen peroxide) promote a decrease in the polymers polydispersity, then relative to the polydispersity of that melt mixed propylene polymer.

Despite the inherent incompatibility between the aqueous hydrogen peroxide and the molten propylene polymer, the aqueous hydrogen peroxide surprisingly has sufficient activity in what is believed to essentially be a heterophasic aqueous/polymer environment to promote chain scission of the propylene polymer and thereby increase its MFI.

Unlike some peroxide based melt mixing processes for increasing the MFI of propylene polymers, the process in accordance with the inventions has been found to be particularly stable, with a given set of processing conditions affording a consistent increase in MFI over both short and long run times.

A notable feature of the present invention is that such advantageous processing control can be achieved using a relatively low level of the active agent (hydrogen peroxide). Furthermore, the MFI increase can advantageously be achieved with little or no production of odoriferous or toxic peroxide-derived by-products. In particular, it is believed that the peroxide-derived by-product formed in accordance with the invention is essentially water.

There is no particular limitation regarding the amount by which the MFI of the propylene polymers may be increased. The increase in MFI that is to be achieved will generally be dictated by the intended application of the resulting modified propylene polymers.

Generally, the MFI of the propylene polymers will be increased by at least about 5%, for example, at least about 25%, or at least about 50%, or at least about 100%, or at least about 300%, or at least about 500%, or at least about 1000%, or at least about 2000%, or at least about 10000%, or at least about 20000%.

The extent of increase in MFI desired will typically be dependent on the intended application of the resulting polymer. For example, in producing injection moulding grade propylene polymer often an increase of at least about 600%, or at least about 2500% is preferred. Thus, a base or starting propylene polymer of MFI of about 10 may be increased to an MFI of about 60, or base or starting propylene polymer of MFI of about 1 may be increased to an MFI of about 25. In producing propylene polymer for fibre spinning applications, a much higher MFI product is generally required and an increase of at least about 10000% may be preferred. Thus, a base or starting propylene polymer of MFI of about 10 may be increased to a MFI of about 1000.

In one embodiment the MFI of the propylene polymer is increased from about 300% to about 20000%

The process in accordance with the invention comprises melt mixing the propylene polymer in the presence of aqueous hydrogen peroxide. By being melt mixed "in the presence of" aqueous hydrogen peroxide (or any other component referred to herein) is meant that the propylene polymer in a molten state is mixed with the aqueous hydrogen peroxide so that both components make intimate physical contact with each other.

Provided that the propylene polymer can be melt mixed in contact with the aqueous hydrogen peroxide to promote an increase in the polymers MFI, there is no particular limitation on the type of melt mixing device that may be used in accordance with the invention. Suitable melt mixing devices include continuous and batch mixes. For example, the melt mixing device may be an extruder such a single screw or twin screw extruder, a static mixer, a cavity transfer mixer, or combinations of two or more such devices. Melt mixing may be conducted in single or multiple steps.

Where the melt mixing device is a twin screw extruder, melt mixing may be conducted in either co- or counter-rotating modes. In some embodiments, it may be desirable to perform the melt mixing in intermeshing co-rotating mode.

The melt mixing process will be conducted at a temperature that is at least sufficient to cause the propylene polymer to remain in a molten state. Those skilled in the art will appreciate that such temperatures will vary depending upon the type of propylene polymer being melt mixed. Generally, the melt mixing will be performed at a temperature ranging from about 170° C. to about 300° C., for example from about 170° C. to about 250° C., or from about 170° C. to about 210° C., or from about 200° C. to about 280° C.

Higher process temperatures may promote further scission but this will generally be at the expense of some product discolouration. Thus the lowest temperature sufficient to bring about the desired degree of scission will generally be preferred. Alternatively, when higher temperatures are desirable this should be in conjunction with shorter residence times.

The extent of increase in MFI can be controlled by adjusting the amount of hydrogen peroxide that is introduced. Additional control can be obtained by adjusting the temperature (higher process temperatures can promote more scission), the screw speed (higher screw speeds can promote more scission) and the screw design (higher shear can promote more scission).

There is no particular limitation concerning the concentration of aqueous hydrogen peroxide that may be used. However, high concentrations of hydrogen peroxide in water (for example, greater than about 60 vol %) may present safety concerns and should be used with caution. Low concentrations of hydrogen peroxide may present difficulties when targeting high MFI increases due to the volume of water introduced concomitantly.

Accordingly, higher concentrations of hydrogen peroxide are often more effective in practice. The concentration of hydrogen peroxide in water is therefore preferably within the range 5-70 wt % (4-62% vol %), for example 30-70. Particularly preferred concentrations of hydrogen peroxide range from 50 wt % to 60 wt %.

There is no particular limitation on how the aqueous hydrogen peroxide is introduced during melt mixing provided that it makes contact with the propylene polymer to promote an increase in MFI. The aqueous hydrogen peroxide solution may be injected by liquid pump directly into the propylene polymer melt under pressure through a cooled injection nozzle. Alternatively, the aqueous hydrogen peroxide can be introduced through the main feed hopper where the propylene polymer is introduced to the melt mixing device.

The amount of hydrogen peroxide solution introduced will be determined by the targeted MFI increase and the concentration of hydrogen peroxide. The amount of hydrogen peroxide per se used will typically be in the range of about 0.1 wt % of the mass of propylene polymer to 2.5 wt % of the mass of propylene polymer. This corresponds to between 0.3 wt % to 7.5 wt % of a 30% hydrogen peroxide aqueous solution.

In one embodiment, the amount of hydrogen peroxide per se used is in the range of about 0.2 wt % of the mass of propylene polymer to about 1 wt %. of the mass of propylene polymer to achieve MFI increases in the range of 100% to 500%.

It has surprisingly been found that the introduction of a fatty acid (e.g. C6-C25, for example C12-C20 fatty acid) can improve the effectiveness of the process.

In one embodiment, the process comprising melt mixing the propylene polymer in the presence of aqueous hydrogen peroxide and a fatty acid.

In one embodiment the fatty acid is stearic acid.

Salts of fatty acids, for example, calcium stearate, which are commonly added to polypropylene as a processing aid or as part of stabiliser packages, appear less effective. Reference to a "fatty acid" herein is therefore not intended to embrace a salt thereof.

It has also been found that the process according to the invention can be more effective when applied to propylene polymer reactor powder. Without wishing to be limited by theory, it is believed that some part of the hydrogen peroxide may be consumed by reaction with additives such as stabilisers commonly incorporated in commercial grades of propylene polymer post reactor. The use of propylene polymer reactor powder may also avoid the formation of by-products from oxidation of any additives present.

When performing the process of the invention using propylene polymer reactor powder it may therefore be desirable to introduce any additives as part of the melt mixing process (e.g. extrusion) at a point past where the aqueous hydrogen peroxide is introduced and the increase in MFI occurs.

Accordingly, in one embodiment the melt mixing device is of a type that enables the aqueous hydrogen peroxide to be introduced to the propylene polymer melt at a separate location from where an additive is introduced to the melt (e.g. as in an extruder). The aqueous hydrogen peroxide will generally be introduced such that it makes contact with the molten polyolefin before (i.e. up stream of where) an additive makes contact with the melt. In other words, the process of the invention may comprise melt mixing the propylene polymer in contact with aqueous hydrogen peroxide and one or more additives whereby propylene polymer that makes contact with the additive has previously made contact with the aqueous hydrogen peroxide.

Generally, the residence time of the propylene polymer in a melt mixing device when performing the process of the invention will be between about 10 seconds and 200, for example between 20 seconds and 200 seconds, or between 50 and 200 seconds, or between 30 seconds and 100 seconds.

Through the control of one or more process parameters such as the residence time of the melt mixed propylene polymer, the shear applied to the propylene polymer by the melt mixing device, the temperature at which melt mixing is conducted and the amount and concentration of hydrogen peroxide is introduced, the increase in the MFI of the propylene polymer can be readily controlled. Those skilled in the art will be able to control such process parameters to achieve a desired increase in the MFI of a selected propylene polymer using a given melt mixing device.

It may be desirable to remove water (typically in the form of steam) from the melt resulting from the introduction of the aqueous hydrogen peroxide by venting the melt through an appropriate port of the melt mixing device. Generally, such venting will be conducted prior to the melt exiting the device. Venting of the melt may be conducted a room pressure or under vacuum. In some embodiments, the invention may be performed without venting water from the polymer melt before it exits the melt mixing device. Those skilled in the art can readily configure a melt mixing device to achieve such results.

The present invention will hereinafter be further described with reference to the following non-limiting examples.

EXAMPLES

Materials:
Polypropylene Moplen HP400N (MFI 11 (g/10 min) 230° C./2.16 Kg, density 0.90 g/mL),
HP560S (MFI 38 (g/10 min) 230° C./2.16 Kg, density 0.90 g/mL) and impact copolymer
EP301G (MFI 1.2 (g/10 min) 230° C./2.16 Kg, density 0.90 g/mL) were supplied by LyondellBasell, Australia.
Polypropylene reactor powders were supplied by LyondellBasell, Australia.
Polypropylene copolymer Dow Versify DE 3300 (MFI 8 (g/10 min); 230° C./2.16 Kg, density 0.866 g/mL) was supplied by Dow Australia.
Hydrogen peroxide 30% (wt/wt) was supplied by Merck.
Hydrogen peroxide 50% (wt/wt) was supplied by Deltrex Chemicals.
Hydrogen peroxide 15% (dilution of 30% hydrogen peroxide with equal weight of water.)
Stearic acid (Palmera) was obtained from Palm-Oleo Sdn. Bhd, Malaysia.
Calcium stearate was supplied by Orica Australia, Extrusion:

Processing was carried out with a Japan Steel Works 30 mm diameter twin screw extruder with length/diameter (L/D) ratio 53 (JSW TEX 30a) which comprised fourteen temperature controlled barrel sections, each with L/D of 3.5, and a cooled feed block with L/D 7. The JSW TEX 30a operates in corotating intermeshing self wiping mode. The screw speed was 150 rpm. The polyolefin was fed into the extruder via a Brabender Flex Wall Plus 50 gravimetric feeder at a rate of 2.5 kg h-1. The feed hopper was maintained under a nitrogen blanket. Aqueous hydrogen peroxide was injected at C5 by a Teledyne Isco 500D Series syringe pump through a water cooled injection nozzle as indicated in the Examples. Vacuum venting (0.06 MPa) was applied at C13. The set temperatures for the 14 barrel sections and the die were 200° C. in all experiments unless otherwise indicated. The screw profile used in most experiments is shown in FIG. 1.

Figure 2:
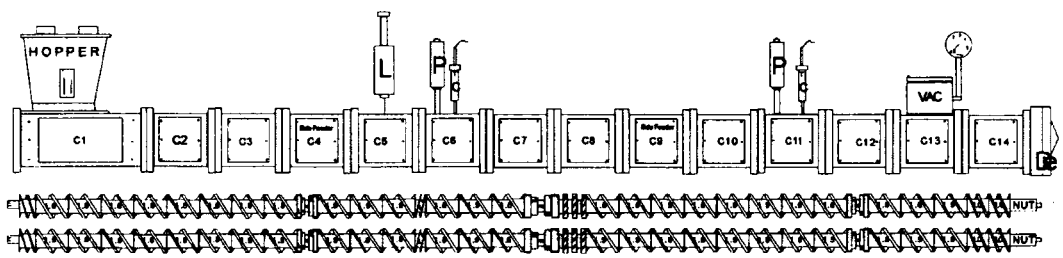
FIG. 2 illustrates the configuration of a low shear screw profile of a JSW TEX 30a 30 mm Twin Screw Extruder used to conduct the process in accordance with the present invention. The screw configuration provides for a less aggressive (lower shear) screw with liquid injection at C5, vacuum venting at C13 and temperature and pressure sensors at C4, C6, C11 and the die.

In some experiments a less aggressive, lower shear, screw was used (as shown in FIG. 2).

Melt flow indexes (MFI) were measured at 230° C. with a 2.16 kg load according to ASTM 1238. Very high MFI materials (MFI>500) were measured at 190° C. with a 2.16 kg load and a 1 mm die.

Drop times were determined by measuring the time taken for the polypropylene strand (cut at the die face) to drop from the die of the extruder to the floor. The die of the JSW twin screw extruder was 1140 mm above the floor. The drop time test was used as a qualitative measure of melt viscosity.

The extruder current is the current drawn by the extruder whilst maintaining a constant screw speed. The extruder current was also used as a qualitative measure of melt viscosity for product MFI <100.

The following Examples demonstrate that the process on a standard injection moulding grade polypropylene and the importance of effective dispersion of the hydrogen peroxide solution.

Examples 1-7

Scissioning of LyondellBasell HP400N polypropylene using 30% hydrogen peroxide.

The processes conditions described above (see Extrusion) were used to chain scission LyondellBasell HP400N polypropylene. The extruder current and drop time were observed to stabilize ca 10 minutes after commencement of hydrogen peroxide injection and then remained constant. See Table 1.

TABLE 1

Results for scissioning LyondellBasell HP400N polypropylene using 30% hydrogen peroxide.

| Example | hydrogen peroxide (mL min-1) | extruder current (amps) | drop time (sec) | MFI (g/10 min) |
|---|---|---|---|---|
| control | 0 | 17.3 | 20.5 | 10.2 |
| 1 | 0.3 | 16.3 | 17.4 | 11.7 |
| 2 | 0.35 | 16.35 | 16.9 | 20 |
| 3 | 0.40 | 15.59 | 11.7 | 35 |
| 4 | 0.45 | 15.7 | 8.1 | 47.1 |
| 5 | 0.60 | 15.6 | 7.8 | 55 |

The processes conditions described above (see Extrusion) as described above used to chain scission LyondellBasell HP400N polypropylene. However a less aggressive screw design was used. See Table 2.

TABLE 2

Results for scissioning LyondellBasell HP400N polypropylene using 30% hydrogen peroxide.

| Example | hydrogen peroxide (mL min-1) | extruder current (amps) | drop time (sec) | MFI (g/10 min) |
|---|---|---|---|---|
| control | 0 | 15.4 | 21.2 | 10.3 |
| 6 | 0.4 | 15.4 | 17.7 | 18 |
| 7 | 1.0 | 15.1 | 5.8 | 202 |

The following Examples demonstrate that the process can be performed using a lower concentration of hydrogen peroxide even though the efficiency of the process is slightly reduced.

Examples 8-10

Scissioning of LyondellBasell HP400N polypropylene using 15% hydrogen peroxide.

The processes conditions described above (see Extrusion) were used to chain scission LyondellBasell HP400N polypropylene. See Table 3

TABLE 3

Results for scissioning LyondellBasell HP400N polypropylene using 15% hydrogen peroxide.

| Example | hydrogen peroxide (mL min-1) | extruder current (amps) | drop time (sec) | MFI (g/10 min) |
|---|---|---|---|---|
| 8 | 0.8 | 15.96 | 12.2 | 27 |
| 9 | 1.0 | 15.85 | 11.4 | 32 |
| 10 | 1.2 | 15.81 | 9.6 | 35.6 |

The following Example demonstrates that the process can also be performed on a polypropylene copolymer formed with a metallocene catalyst.

Example 11

Scissioning of Dow Versify DE 3300 polypropylene copolymer using 30% hydrogen peroxide.

The processes conditions described above (see Extrusion) were used to chain scission. Dow Versify DE 3300 polypropylene (MFI 8). The less aggressive screw design was used. See Table 4.

TABLE 4

Results for scissioning Dow Versify 3300 polypropylene using 30% hydrogen peroxide

| Example | hydrogen peroxide (mL min-1) | extruder current (amps) | drop time (sec) | MFI (g/10 min) |
|---|---|---|---|---|
| 11 | 0.5 | 15.4 | — | 18 |

The following Examples demonstrate the effect of a fatty acid in the free acid form in enhancing the efficiency of the process.

Examples 12-14

Scissioning of LyondellBasell HP400N polypropylene using 30% hydrogen peroxide with added stearic acid or calcium stearate.

The processes conditions described above (see Extrusion) were used to chain scission. LyondellBasell HP400N polypropylene. However 0.5 wt % of either stearic acid or calcium stearate was added to the polypropylene through the main hopper. See Table 5.

TABLE 5

Results for scissioning LyondellBasell HP400N polypropylene using 30% hydrogen peroxide.

| Example | hydrogen peroxide (mL min-1) | additive | extruder current (amps) | drop time (sec) | MFI (g/10 min) |
|---|---|---|---|---|---|
| control | 0 | none | 17.3 | 20.5 | 10.2 |
| 12 | 0.4 | none | 15.7 | 10.2 | 35 |
| 13 | 0.4 | stearic acid | 15.5 | 7.5 | 44 |
| 14 | 0.4 | calcium stearate | 15.9 | 10.2 | 36.4 |

The following examples demonstrate the process on a reactor powder.

Examples 14-16

Scissioning of polypropylene reactor powder (MFI 6 g/10 min) using 30% hydrogen peroxide.

The processes conditions described above (see Extrusion) were used to chain scission a reactor powder (nominal MFI 6 g/10 min). But with the less aggressive screw, venting to atmosphere rather than vacuum at C13, and the set temperatures for the 14 barrel sections and the die were 175° C. See Table 6

TABLE 6

Results for scissioning reactor powder (MFI 8 g/10 min) using 30% hydrogen peroxide.

| Example | hydrogen peroxide (mL min-1) | extruder current (amps) | drop time (sec) | MFI (g/10 min) |
|---|---|---|---|---|
| Control | 0 | — | — | 57 |
| 14 | 0.5 | — | 8 | 91.7 |
| 15 | 1.0 | — | 6.6 | 147 |
| 16 | 1.5 | — | 7.4 | 134 |
| 17 | 2.0 | — | 6.2 | 135 |

The following Example demonstrates that the application of the process on a polypropylene copolymer Example 18

Scissioning of LyondellBasell EP301G impact copolymer using 30% hydrogen peroxide.

The processes conditions described above (see Extrusion) were used to chain scission LyondellBasell EP301G impact copolymer (MFI 1.2). A screw speed of 200 rpm was used and the set temperatures for the 14 barrel sections and the die were 210° C. See Table 7.

TABLE 7

Results for scissioning LyondellBasell EP301G using 30% hydrogen peroxide.

| Example | hydrogen peroxide (mL min$^{-1}$) | extruder current (amps) | drop time (sec) | MFI (g/10 min) |
|---|---|---|---|---|
| Control | 0 | 20.7 | 30 | 1.21 |
| 18 | 1.4 | 17.2 | 8.2 | 23.4 |

The following Examples illustrate the application to polypropylene homopolymers, random copolymer or heterophasic copolymer to achieve target MFI values typical of those required for injection moulding applications.

Examples 19-30

Figure 3:
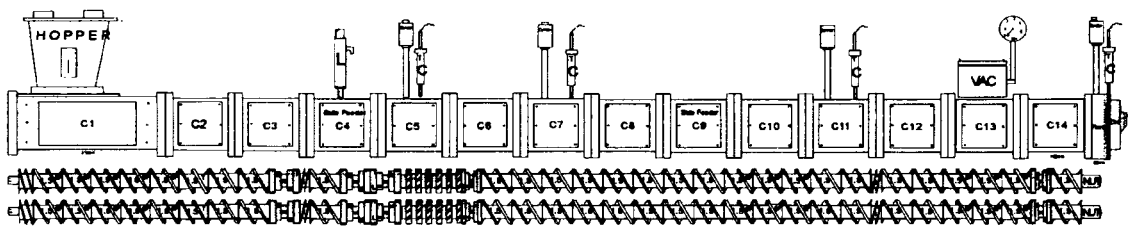
FIG. 3 illustrates the configuration of an alternative low shear screw profile of a JSW TEX 30a 30 mm Twin Screw Extruder used to conduct the process in accordance with the present invention. The screw configuration provides for an alternative less aggressive (lower shear) screw with liquid injection at C4, vacuum venting at C13 and temperature and pressure sensors at C5, C7, C11 and the die.

The process described above was used to increase the MFI of a series of polypropylene reactor powders with throughput of 3.6 kg hr$^{-1}$ and barrel temperatures and extruder RPM and hydrogen peroxide addition rates as shown. A stabilizer package was introduced by gravimetic feeder either though the main feed hopper or by gravimetric feeder at zone 13 (no vacuum was applied in this case) as indicated. The less aggressive screw (FIG. 3) was used. See Table 8.

TABLE 8

Results for scissioning polypropylene reactor powders using hydrogen peroxide.

| Example | Base MFI$^a$ g/10 min | PP Type$^b$ | Product MFI g/10 min | Stabiliser$^c$ | RPM | Temp ° C. | Hydrogen peroxide mL/min |
|---|---|---|---|---|---|---|---|
| 19 | 6 | Homo | 41 | Die | 200 | 205° | 0.25 |
| 20 | 6 | Homo | 37 | Hopper | 200 | 205° | 0.44 |
| 21 | 10 | Homo | 57 | Die | 200 | 205° | 0.34 |
| 22 | 10 | Homo | 57 | Hopper | 200 | 205° | 0.6 |
| 23 | 1.3 | Raco | 13 | Die | 200 | 215° | 0.115 |
| 24 | 1.3 | Raco | 12.4 | Hopper | 200 | 220° | 0.28 |
| 25 | 1.3 | Raco | 23 | Die | 200 | 220° | 0.45 |
| 26 | 1.3 | Raco | 23 | Hopper | 200 | 220° | 0.4 |
| 27 | 13.8 | Heco | 56 | Die | 200 | 230° | 0.7 |
| 28 | 13.8 | Heco | 54 | Hopper | 250 | 235° | 0.7 |
| 29 | 5 | Heco | 23 | Die | 200 | 225° | 0.3 |
| 30 | 5 | Heco | 21.2 | Hopper | 200 | 235° | 0.7 |

$^a$MFI of reactor powder.
$^b$Polypropylene type, Homo = polypropylene homopolymers, Raco = polypropylene random copolymer, Heco = polypropylene heterophasic copolymer.
$^c$Position of stabilizer addition, die = zone 13, immediately before die exit, hopper = through main feed hopper.

It was noted that lower hydrogen peroxide addition rates were required to provide a similar MFI with addition of additives (stabilisers) at the die. There was also substantially less discoloration of the product and less consumption of the stabilizer during processing. The rheology of the product was indistinguishable from that produced by conventional processing with organic peroxide. Organic volatiles were below detection limits for all samples (as measured by gas chromatography/mass spectrometry (GCMS)).

The following Examples illustrate the application to achieve high MFI typical of those required for some fibre spinning application.

Examples 31-35

The Process described above was used to increase the MFI of LyondellBasell polypropylene HP400N (MFI 11, Examples 31-34) or HP560S (MFI 38, Example 35) with polypropylene throughput of 5 kg hr$^{-1}$ and barrel temperatures, screw rotation speed (RPM) and hydrogen peroxide concentration as shown. The less aggressive screw (FIG. 3) was used. See Table 9.

TABLE 9

Results for scissioning LyondellBasell HP400N or 560S using hydrogen peroxide.

| Example | Start MFI | Product MFI g/10 min | RPM | Temp$^a$ °C. | % H2O2 (wt/wt)$^b$ |
|---|---|---|---|---|---|
| 31 (HP400N) | 11 | 200 | 250 | 250° | 30 |
| 32 (HP400N) | 11 | 600 | 250 | 280° | 30 |
| 33 (HP400N) | 11 | 1100 | 300 | 280° | 30 |
| 34 (HP400N) | 11 | 2600 | 350 | 280° | 50 |
| 35 (HP560S) | 38 | 2600 | 350 | 280° | 50 |

$^a$Zones 2-9 were at the temperature shown, Zones 10-14 and the die were set at 170° C.
$^b$Hydrogen peroxide concentration, introduced at 1 ml min$^{-1}$.

The following Examples illustrate the dependence of the efficiency of the process on process temperature, hydrogen peroxide amount and concentration, extruder RPM (shear), and polypropylene throughput.

Examples 36-48

The process described above was used to increase the MFI of LyondellBasell polypropylene HP400N (MFI 11) with polypropylene throughput, barrel temperatures, extruder RPM and hydrogen peroxide concentration and rate of addition as shown. Results from Example 34 are duplicated here for reference. The less aggressive screw (FIG. 3) was used. See Table 10.

The control experiments show that the extent of chain scissioning is small when no peroxide is added even when high process temperatures are used. The extent of chain scission (or MFI value) increases with increase in temperature, increase in extruder rotation speed (RPM), increase in peroxide concentration, and increase in peroxide feed rate.

TABLE 10

Results for scissioning LyondellBasell HP400N using hydrogen peroxide.

| Example | Product MFI g/10 min | RPM | Temp$^a$ °C. | H2O2 % | H2O2 mL/min | Throughput kg/h |
|---|---|---|---|---|---|---|
| 36 | 1800 | 250 | 280° | 50 | 1 | 5 |
| 37 | 1950 | 300 | 280° | 50 | 1 | 5 |
| (34) | 2600 | 350 | 280° | 50 | 1 | 5 |
| 38 | 2850 | 400 | 280° | 50 | 1 | 5 |
| (34) | 2600 | 350 | 280° | 50 | 1 | 5 |
| 39 | 1700 | 350 | 270° | 50 | 1 | 5 |
| 40 | 1150 | 350 | 250° | 50 | 1 | 5 |
| 41 | 600 | 350 | 250° | 50 | 1 | 5 |
| 42 | 170 | 350 | 280° | 50 | 0.25 | 5 |
| 43 | 225 | 350 | 280° | 50 | 0.5 | 5 |
| (34) | 2600 | 350 | 280° | 50 | 1 | 5 |
| 44 | 4200 | 350 | 280° | 50 | 1.5 | 5 |
| (34) | 2600 | 350 | 280° | 50 | 1 | 5 |
| 45 | 850 | 350 | 280° | 30 | 1 | 5 |
| 46 | 1450 | 350 | 280° | 30 | 1.797$^b$ | 5 |
| 47 | 420 | 350 | 280° | 50 | 4 | 20 |
| 48 | 190 | 350 | 280° | 30 | 4 | 20 |
| control | 12.7 | 350 | 250 | none | — | 5 |
| control | 17.3 | 350 | 260 | none | — | 5 |
| control | 17.4 | 350 | 270 | none | — | 5 |
| control | 17.8 | 350 | 280 | none | — | 5 |

$^a$Zones 2-9 were at the temperature shown, Zones 10-14 and the die were set at 170° C.
$^b$Rate of hydrogen peroxide addition in Example 46 provides the same molar addition rate of hydrogen peroxide as Example 34.

The following comparative example shows that it is possible to achieve the same MFI increase as with a conventional organic peroxide.

Comparative Example 1

The Process described above for Example 5 was used to increase the MFI of LyondellBasell polypropylene HP400N a polypropylene throughput of 2.5 kg h$^{-1}$ with a screw rotation speed of 150 rpm and the less aggressive screw (FIG. 2) were used for all experiments. The set temperatures for the 14 barrel sections and the die were 200° C. See Table 11.

TABLE 11

Results for scissioning LyondellBasell HP400N.

| Example | peroxide$^a$ | peroxide mL/min | extruder current amps | drop time sec | MFI g/10 min |
|---|---|---|---|---|---|
| control | none | 0 | 17.3 | 20.5 | 10.2 |
| (5) | 30% hydrogen peroxide | 0.60 | 15.6 | 7.8 | 55 |
| comparative example | Trigonox 101 | 0.06 | 14.9 | — | 55 |

$^a$Trigonox 101 = 2,5-bis(tert-butylperoxy)-2,5-dimethylhexane

For the process conditions indicated, a greater volume amount of hydrogen peroxide was required to achieve the same MFI increase.

Examples 49-60

The product from examples 19-30 were analysed for residual volatiles by GCMS. The conditions used were as follows. The instrument used was an Agilent 6890 GC coupled with an Agilent 5973 Mass Selective Detector, an Agilent 7694 automated headspace sampler and a J&W Scientific DB-Petro (DB-1) column [Capillary Column (100 m×0.25 mm) coated with poly(dimethylsiloxane)]. Ultra high purity helium was used as carrier gas (1 mL/min). The inlet temperature was 270° C. operating in split mode. The temperature program was as follows: 40° C., hold for 12 mins; 40° C. to 200° C., heating rate 20° C./min; 200° C., hold for 10 mins; 200° C. to 250° C., heating rate 10° C./min; 250° C., hold for 5 mins. The results of analysis are provided in Table 12. Samples of conventionally visbroken samples are also shown in the table for comparison. All examples and comparative examples also showed the typical presence of C6 through to C15 polypropylene oligomers (100-140 ppm).

TABLE 12

Results for scissioning polypropylene reactor powders using hydrogen peroxide.

| Example | Product from Example | Product MFI g/10 min | Hydrogen peroxide mL/min | Acetone ppm$^a$ | t-butanol ppm$^a$ |
|---|---|---|---|---|---|
| 49 | 19 | 41 | 0.25 | nd | nd |
| 50 | 20 | 37 | 0.44 | nd | nd |
| 51 | 21 | 57 | 0.34 | nd | nd |
| 52 | 22 | 57 | 0.6 | nd | nd |
| 53 | 23 | 13 | 0.115 | nd | nd |
| 54 | 24 | 12.4 | 0.28 | nd | nd |
| 55 | 25 | 23 | 0.45 | nd | nd |
| 56 | 26 | 23 | 0.4 | nd | nd |
| 57 | 27 | 56 | 0.7 | nd | nd |
| 58 | 28 | 54 | 0.7 | nd | nd |
| 59 | 29 | 23 | 0.3 | nd | nd |

TABLE 12-continued

Results for scissioning polypropylene reactor powders using hydrogen peroxide.

| Example | Product from Example | Product MFI g/10 min | Hydrogen peroxide mL/min | Acetone ppm[a] | t-butanol ppm[a] |
|---|---|---|---|---|---|
| 60 | 30 | 21.2 | 0.7 | nd | nd |
| HP566S[c] | — | 38 | — | 124 | 51 |
| HP741T[c] | — | 60 | — | 95 | 41 |
| EP341T[c] | — | 55 | — | 97 | 68 |
| RP241R[c] | — | 25 | — | 120 | 79 |
| comparative example[d] | — | 28 | — | nr | 60-70 |
| comparative example[e] | — | 28 | — | nr | 20-30 |
| detection limit | | | | 13 | 13 |

[a] nd = not detected (i.e. <13 ppm), nr = not reported
[c] Typical data for conventionally vis-broken polypropylene (Trigonox 101 or equivalent initiator) for LyondelBasell materials of grade indicated using same analytical procedure.
[d] data taken from U.S. Pat. No. 6,599,990 (0.006% Luperox 101 initiator)
[e] data taken from U.S. Pat. No. 6,599,990 (0.006% 4-t-amylperoxy-4-methanol-2-pentanol initiator)

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

What is claimed is:

1. A process for increasing the melt flow index of a propylene polymer, the process comprising forming a propylene polymer melt by melting a propylene polymer and melt mixing the propylene polymer melt in the presence of aqueous hydrogen peroxide having a concentration of hydrogen peroxide in water within the range of 30-70 wt %, wherein the aqueous hydrogen peroxide is injected directly into the propylene polymer melt.

2. The process according to claim 1, wherein the propylene polymer is a polypropylene homopolymer, polypropylene copolymer, or polymer blend containing a polypropylene homopolymer and/or polypropylene copolymer.

3. The process according to claim 1 further comprising melt mixing one or more additives with propylene polymer that has previously been melt mixed in the presence of the aqueous hydrogen peroxide.

4. The process according to claim 1, wherein the propylene polymer that is to be melt mixed in the presence of the aqueous hydrogen peroxide is in the form of reactor powder.

5. The process according to claim 1, wherein the melt flow index of the propylene polymer is increased by at least 300%.

6. The process according to claim 1, wherein the propylene polymer is melt mixed in the presence of aqueous hydrogen peroxide and a C6-C25 fatty acid.

7. The process according to claim 1, wherein melt mixing is performed in a melt mixing device with venting to remove water from the polymer melt before the polymer melt exits the melt mixing device.

8. The process according to claim 1, wherein volatile organic compounds, as measured by gas chromatography/mass spectrometry (GCMS), present in the resulting propylene polymer having an increased melt flow index are substantially the same as those present in the propylene polymer prior to it being melt mixed with the aqueous hydrogen peroxide.

9. The process according to claim 1, wherein the concentration is within the range 50-70 wt %.

10. The process according to claim 1, wherein the concentration is within the range 50-60 wt %.

* * * * *